Figure 1:

March 28, 1950     W. A. BEMAN ET AL     2,502,366
INSECTICIDE BASE OIL-TOXICANT Filed May 15, 1946

Inventors
WARREN A. BEMAN,
ROBERT B. KILLINGSWORTH
AND ARTHUR C. PAPST.

By Francis J. Johnston
Agent or Attorney

Patented Mar. 28, 1950

2,502,366

UNITED STATES PATENT OFFICE 2,502,366

INSECTICIDE BASE OIL TOXICANT

Warren A. Beman, Albany, and Robert B. Killingsworth and Arthur C. Pabst, Douglaston, N. Y., assignors to Socony-Vacuum Oil Company, Incorporated, a corporation of New York Application May 15, 1946, Serial No. 669,892

1 Claim. (Cl. 196—149)

The present invention relates to a novel carrier for insect toxicants which itself is toxic to certain insects but harmless to verdant plants and a method for producing the novel carrier-toxicant.

It has been recognized for a long time that hydrocarbon mixtures which were to be used as carriers for toxicants in agricultural sprays should be substantially free from aromatic and naphthenic hydrocarbons. In other words, the experts in the art had determined that a predominantly paraffinic mixture of hydrocarbons was the most desirable oil for use as a carrier for toxicants for sprays to be used on gardens, orchards and the like. Prior art oleaginous carriers are prepared by treating an oil of suitable boiling range with sulfuric acid or other agents to remove non-paraffinic constituents. The prior art product which the experts in the art recognize as the best product commercially available is obtained by an exceptionally heavy and costly acid treatment of a selected cut from Pennsylvania crude. Other commercially available prior art products of lower quality can be improved to a point at which they are comparable to the best prior art material. However, such improvement can only be obtained at the expense of considerable loss of oil and by the use of say 200 pounds of oleum per barrel of product.

Most, if not all, of the prior art oils including that product held to be the best now available are injurious to such plants as potato vines and bean plants and are herbicides with respect to such sensitive plants as tomato vines and beets. Even such highly resistant plants as carrots are killed by aromatic oils of the boiling range of the novel carrier-toxicant.

Thus, it is manifest that the art has need for a product which will not injure the most sensitive plant and for a method for producing such a product which is economically more advantageous.

Although the art has been confronted with the problem of controlling the mealy bug which attacks coniferous trees and has been a source of great loss to nurserymen, no effective means has been known prior to the present invention which provided control of this pest. The resistance of the Japanese beetle to most toxicants is too well known to require comment, yet the product of the present invention is effective in killing these pests. Aphids also are killed by the novel product described hereinafter. Although the novel product per se is not a toxicant for flies, it is an excellent carrier for toxicants because of its odorless nature. Thus, it is apparent that several problems which have confronted the art for years have been solved by the novel product and the economically attractive method provided for its production.

The novel product is of particular interest because the bulk of the present production of insecticide base oils is consumed for household uses and in the cosmetic industry. For this reason the fact that the novel product is practically odorless and non-irritating to the human skin provides a distinct advantage over the prior art products which suffer from both of these deficiencies.

Figure 2:

Accordingly, it is an object of the present invention to provide a novel toxicant for mealy bugs, Japanese beetles and aphids. It is another object of the present invention to provide a practically odorless insecticide base oil which is substantially non-irritating to the human skin. It is a further object of the present invention to provide an insecticide base oil which is non-injurious to such sensitive plants as beet plants and tomato vines. These and other objects and advantages will become apparent from the following description taken in conjunction with the drawings, in which Figure 1 is a reproduction of a photograph taken 24 hours after spraying potato vines with various oils including the novel carrier-toxicant; and Figure 2 is a reproduction of a photograph of the plants of Figure 1 taken 8 days after spraying.

Although it has been accepted that insecticide base oils which are predominantly paraffinic are most desirable, it is recognized that any oil containing aromatic and naphthenic hydrocarbons cannot be treated cheaply to provide a base oil of substantially paraffinic nature. Consequently, a method by which an entirely paraffinic or, conversely, a non-aromatic, non-naphthenic insecticide base oil is produced initially and directly has many economic and technological advantages as compared with oils which initially contain appreciable amounts of aromatic and naphthenic hydrocarbons. The present method provides such an oil; to wit: an oil which initially is predominantly and practically entirely constituted of paraffinic hydrocarbons.

The novel oil is produced by alkylating isoparaffins with olefins, preferably employing hydrogen fluoride as a catalyst. The novel base oil-toxicant is obtained by alkylating $C_3$ to $C_5$, preferably $C_4$, isoparaffins with $C_4$ and $C_5$ olefins. The alkylate is then distilled in the conventional manner and a cut having an initial boiling point of about 250 degrees Fahrenheit and an end point of about 850 degrees Fahrenheit condensed. It is preferred, however, to use a narrower fraction having an initial boiling point of about 400 degrees and an end point of about 500 degrees Fahrenheit. The oils so obtained are substantially pure paraffins and isoparaffins devoid of aromatic and naphthenic hydrocarbons and contaning only small amounts of olefins which are readily removed in any suitable manner such as by a light sulfuric acid treat. The preferred novel base oil and toxicant is composed of paraffins and predominantly of isoparaffins. In general, the distillate boiling between about 350 and about 500 degrees Fahrenheit contains about 45 to about 70 per cent $C_{12}$ paraffins and isoparaffins, the remainder being heavier paraffins and isoparaffins and a small amount of olefins.

Typical inspection records of samples of the preferred form of the novel base oil and toxicant are given in Table I:

Table I

| Sample No. | 1 | 2 | 3 | 4 | 5 | 6 | 7 |
|---|---|---|---|---|---|---|---|
| Gravity, °A. P. I | 48.5 | 48.3 | 49.2 | 52.5 | 53.2 | 52.0 | 48.5 |
| Aniline Pt., °F | 188.5 | 183 | 175 | 187.5 | 185 | 186.0 | 188.5 |
| Flash (TCC), °F | 163 | 157 | 144 | 146 | 136 | 144 | 163 |
| A. S. T. M., °F.: | | | | | | | |
| IBP | 396 | 380 | 372 | 374 | 364 | 372 | 396 |
| 10% | 413 | 391 | 380 | 383 | 371 | 379 | 413 |
| 50% | 440 | 416 | 393 | 394 | 383 | 393 | 440 |
| 90% | 478 | 485 | 459 | 438 | 435 | 432 | 478 |
| FBP | 489 | 510 | 486 | 482 | 470 | 472 | 489 |

The novel product is readily distinguished from the prior art products by means other than observing its toxic effect upon such insects as mealy bugs, Japanese beetles and aphids or its nonherbicidal effect on such sensitive plants as tomato vines and beets. The most distinguishing characteristic readily determined in the laboratory is the paraffinicity index. While the aniline point of the novel base oil and toxicant is not markedly different from those of several prior art base oils, the paraffinicity index clearly distinguishes the novel dual purpose oil from prior art single purpose base oils.

The paraffinicity index (P. I.) may be expressed as follows:

$$P.I. = \left[\frac{\text{Saybolt thermo-viscosity @ }60°F.}{5}\right] - 10(46\text{-A.P.I. gravity})$$

Using the conversion method developed by L. Brown (Thermoviscosity of Light Distillates, A. S. T. M. Bulletin, Dec. 1940, page 23), it is possible to substitute the more commonly determined centistokes for the thermoviscosity, as follows:

Saybolt thermoviscosity @ 60° F.=
(centistokes @ 100° F. ×262)−39

Hence, the equation for P. I. may be rewritten as follows:

$$P.I. = \left[\frac{(\text{Viscosity in centistokes @ }100°F. \times 262)-39}{5}\right] - 10(46\text{-A.P.I. gravity})$$

The data in Table II establishes that P. I. differentiates the principal classes of hydrocarbons:

Table II

| Type | Hydrocarbon | Viscosity Ctsks. @ 100° F. | Gravity, °API | P. I. |
|---|---|---|---|---|
| Aromatic | Benzene ($C_6$) | 0.611 | 29.0 | −145.8 |
| Naphthenic | Cyclohexane ($C_6$) | 0.975 | 49.4 | +77.3 |
| Paraffinic | n-Hexane ($C_6$) | 0.456 | 80.7 | +363.1 |
| Isoparaffinic | Neohexane ($C_6$) | 0.503 | 84.2 | +400.4 |
| Aromatic | Xylene ($C_8$) | 0.630 | 31.9 | −114.2 |
| Naphthenic | Ethylcyclohexane ($C_8$) | 0.852 | 47.2 | +48.8 |
| Paraffinic | n-Octane ($C_8$) | 0.640 | 68.7 | +252.7 |
| Isoparaffinic | Isooctane ($C_8$) | 0.637 | 71.7 | +282.6 |

The data in Table II clearly shows that for a given size of a hydrocarbon molecule as measured by the number of carbon atoms, the P. I. distinctly increases in the order: aromatics, naphthenes, paraffins and isoparaffins. The spread of values between the naphthenes and paraffins is particularly important. The novel base oil-toxicant can be readily distinguished from prior art base oils on the basis of paraffinicity index (P. I.) as is readily understood after a study of the data collected in Table III.

Table III

| Material | Viscosity Ctsks. @ 100° F. | Gravity, °API | P. I. |
|---|---|---|---|
| Novel Product Sample A | 2.42 | 48.8 | 147.0 |
| Novel Product Sample B | 2.16 | 48.6 | 131.4 |
| Novel Product Sample D | 1.96 | 51.7 | 151.9 |
| Prior Art Product 1 | 1.53 | 47.6 | 88.4 |
| Prior Art Product 2 (best prior art base oil) | 1.73 | 48.2 | 104.8 |
| Prior Art Product 3 | 1.84 | 48.4 | 112.6 |

Complete inspections of the novel products and prior art insecticide base oils are given in Table IV:

value as a carrier for toxics in house sprays arises from its practically odorless nature.

The mildness of the novel dual purpose base

Table IV

|  | Novel Product | | | | Prior Art Insecticide Base Oils | | |
|---|---|---|---|---|---|---|---|
|  | Sample A | Sample B | Sample C | Sample D | 1 | 2 | 3 |
| Graviety, ° A. P. I. | 48.8 | 48.6 | 49.2 | 51.7 | 47.6 | 48.2 | 48.4 |
| Aniline Point, °F | 188.5 | 183.0 | 175.0 | 187.5 | 156.3 | 147.2 | 177.4 |
| Flash Tag Closed | 163 | 157 | 144 | 146 | 148 | 165 (PM) | 176 (PM) |
| ASTM Distillation: | | | | | | | |
| IBP | 396 | 380 | 372 | 374 | 374 | 394 | 393 |
| 10% | 413 | 391 | 380 | 383 | 382 | 406 | 418 |
| 20% | 418 | 397 | 382 | 386 | 387 | 411 | 424 |
| 30% | 424 | 402 | 386 | 389 | 392 | 416 | 428 |
| 40% | 431 | 408 | 388 | 391 | 396 | 420 | 433 |
| 50% | 440 | 416 | 393 | 394 | 401 | 425 | 438 |
| 60% | 449 | 428 | 398 | 398 | 406 | 430 | 442 |
| 70% | 459 | 444 | 406 | 404 | 412 | 437 | 448 |
| 80% | 469 | 456 | 424 | 414 | 421 | 446 | 456 |
| 90% | 478 | 485 | 459 | 438 | 436 | 458 | 467 |
| FBP | 489 | 510 | 486 | 482 | 484 | 504 | 494 |
| Recovery, Per Cent | 98.0 | 98.0 | 98.0 | 99.0 | 98.0 | 98.5 | 98.5 |
| Odor | Very bland—like USP Mineral Oil | | | | (¹) | (²) | (³) |
| Viscosity @ 100° F. Csks | 2.42 | 2.16 |  | 1.96 | 1.53 | 1.73 | 1.84 |
| Paraffinicity Index | 147.0 | 131.4 |  | 151.9 | 88.4 | 104.8 | 112.6 |

¹ Sweet—slight petroleum odor.  ² Very bland.  ³ Better than 1 and poorer than 2.

In general, the novel base oil toxicant is characterized by a paraffinicity index (P. I.) of at least 125. This value is sufficiently different from the paraffinicity indices of prior art products to ensure that no confusion will arise. Therefore, the novel product is defined as a paraffinic, predominantly isoparaffinic, mineral oil fraction having a boiling range of about 250 degrees to about 850 degrees Fahrenheit and a paraffinicity index (P. I.) as defined hereinbefore of at least 125. The preferred material has a boiling range of about 400 to about 500 degrees Fahrenheit and a paraffinicity index (P. I.) of at least 125.

The novel insecticide base oil and toxicant may be used in agricultural and household sprays as a carrier for toxics, such as DDT (dichloro diphenyl trichloroethane), pyrethrum, rotenone, thiocyanates and other toxics. The sprays thus provided are novel in their almost complete freedom from toxic effects on plants and growing foliage. As a rule, petroleum derivatives are toxic if applied to plants in high concentration, causing acute injury and chronic injury which in many instances results in the death of the plant and loss of crops. It has been demonstrated that the novel base oil and toxicant can be applied in undiluted state, in heavy dosage to foliage and to the roots of plants with, in many cases, no more effect on the plant than potable water.

The novel dual purpose base oil and toxicant has marked insecticidal value towards certain varieties of insects. It has been demonstrated that 90–95 per cent kill of mealy bugs can be obtained by spraying plants infected with this insect with the novel product containing no other known insecticide. The mealy bug is a very difficult insect to control since it has a waxy protective coating and is not readily wet by the conventional emulsion type sprays. In so far as applicants have been able to determine, there has been no effective method for controlling this insect prior to the present discovery.

It has been demonstrated that the novel dual purpose base oil-toxicant is effective in killing the Japanese beetle and aphids. On the other hand, while not effective against the house and cattle flies the novel product is an excellent base oil or carrier for toxics such as pyrethrum. Its oil-toxicant is dramatically demonstrated in a visual manner by the reproductions, Figures 1 and 2. Some potato vines were sprayed with the novel product and others were sprayed with other petroleum oils. The vine in pot 1 was sprayed with a 400–500 degrees Fahrenheit cut of an aromatic oil; that in pot 2 was sprayed with Stoddard solvent. The vine in pot 3 was sprayed with a well refined 360–460 degrees Fahrenheit insecticide base oil from mixed base crude. That in pot 4 was sprayed with a highly refined 400–500 degrees Fahrenheit paraffinic solvent and the vine in pot 5 was sprayed with a 400–500 degrees Fahrenheit cut of the novel dual purpose base oil-toxicant. The photograph of which the reproduction is presented as Figure 1, was taken 24 hours after the vines were sprayed. The plants which had been sprayed with the aromatic oil and with Stoddard solvent died in 24 hours. The plants sprayed with the 360–460 degrees Fahrenheit insecticide base oil from mixed base crude and the highly refined 400–500 degrees Fahrenheit paraffinic solvent are in rather poor condition. On the other hand, the plant in pot 5 which had been sprayed with the novel dual purpose base oil-toxicant is flourishing.

The reproduction presented as Figure 2 was taken 8 days after spraying potato vines. The vines had been sprayed with various petroleum oils as indicated in the following tabulation:

| Pot No. | Oil |
|---|---|
| 1 | 400–500° F. aromatic oil. |
| 2 | Stoddard Solvent. |
| 3 | Well refined 360–460° F. insecticide base oil from mixed base crude. |
| 4 | Highly refined 400–500° F. paraffinic solvent (#1 of Table IV). |
| 5 | 400–500° F. fraction of novel product. |
| 6 | Most highly refined paraffinic insecticide base oil best of those now commercially available (#2 of Table IV). |
| Unnumbered | Very volatile oil; (IBP 210° F., 90% @ 268° F.) |
| 8 | Well refined kerosene (350–520° F.). |

It will be noted that 8 days after spraying in practically all cases except that of the vine in pot #5, death of the plant has resulted from the spray. Particular attention should be given to the vine in pot #6. This vine was sprayed with a prior art highly refined paraffinic insecticide base oil which is considered by many experts to be the best now commercially available. Nevertheless even this highly refined oil destroyed the plant. The vine in the unnumbered pot was sprayed with a highly volatile oil. The volatility of the oil reduced the amount of damage done to the vine. On the other hand, the volatility of the oil makes it unsuitable for use as an insecticide base oil.

| Plant | 400–500° F. Aromatic Solvent | Stoddard Solvent | Kerosene | Highly Refined Paraffinic Base Oil | Novel Product |
|---|---|---|---|---|---|
| Potato | Kill—4 hours | Kill—2 days | Kill—5 days | Kill—8 days | No kill; no burning. |
| Bean | do | do | do | Bad burn; plant recovered. | No burn; no noticeable effect. |
| Tomato (very sensitive) | Kill | Kill | Kill | Kill | Slight burning. |
| Beet (slightly less sensitive than tomato) | do | do | do | Injury | No effect. |
| Carrot (highly resistant) | do | No effect | No effect | No effect | Do. |

The foregoing clearly establishes that the novel base oil-toxicant is far superior to any insecticide base oil now commercially available. It is to be emphasized that such a sensitive plant as the tomato vine when sprayed with the novel product in undiluted condition was only slightly burned whereas when sprayed with the best available insecticide base oil the vine died.

We claim:

A toxicant for mealy bugs consisting of a mixture of isoparaffinic and paraffinic hydrocarbons obtained by alkylation of $C_3$ to $C_5$ isoparaffins with $C_4$ and $C_5$ olefins in the presence of a catalyst selected from the group consisting of sulfuric acid and hydrofluoric acid; said mixture having an initial boiling point of about 364° to about 396° F., a 10 per cent point of about 371° to about 413° F., a 50 per cent point of about 383° to about 440° F., a 90 per cent point of about 432° to about 485° F., and a final boiling point of about 470° to about 510° F.; said mixture having a gravity of about 48.3 to about 53.2° A. P. I., a viscosity @ 100° F. of about 1.9 to about 2.5 centistokes, a paraffinicity index of about 131.4 to about 151.9 and an unsulfonatable residue of at least 90 per cent; said mixture consisting of about 45 to about 70 weight per cent $C_{12}$ isoparaffinic and paraffinic hydrocarbons and the balance substantially all lighter and heavier isoparaffins and paraffins, and being substantially devoid of aromatic and naphthenic hydrocarbons.

WARREN A. BEMAN.
ROBERT B. KILLINGSWORTH.
ARTHUR C. PABST.

REFERENCES CITED

The following references are of record in the file of this patent:

UNITED STATES PATENTS

| Number | Name | Date |
|---|---|---|
| 2,166,500 | Lyman | July 18, 1939 |
| 2,271,860 | Goldsby | Feb. 3, 1942 |
| 2,322,664 | Russell | June 22, 1943 |
| 2,324,099 | Mason | July 13, 1943 |
| 2,376,051 | Hachmuth | May 15, 1945 |
| 2,379,022 | Matuszak | June 26, 1945 |
| 2,397,085 | Boedeker et al. | Mar. 26, 1946 |
| 2,405,775 | Bradley | Aug. 13, 1946 |
| 2,408,983 | Kollen | Oct. 8, 1946 |

Certificate of Correction

Patent No. 2,502,366                                                          March 28, 1950

WARREN A. BEMAN ET AL.

It is hereby certified that errors appear in the printed specification of the above numbered patent requiring correction as follows:

Column 3, lines 21 and 22, for "contaning" read *containing*; columns 5 and 6, Table IV, first line of the first column thereof, for "Graviety" read *Gravity*; same table, seventh column thereof, third line from bottom, for "(1)" read *(2)*; same Table IV, eighth column, third line from bottom, for "(1)" read *(3)*;

and that the said Letters Patent should be read with these corrections therein that the same may conform to the record of the case in the Patent Office.

Signed and sealed this 22nd day of August, A. D. 1950.

[SEAL]

THOMAS F. MURPHY,
*Assistant Commissioner of Patents.*